July 22, 1969   F. FRITSCH   3,456,520
TRANSMISSION FOR MOVING LARGE EQUIPMENT, PARTICULARLY CONVERTERS
Filed Feb. 12, 1968   2 Sheets-Sheet 1
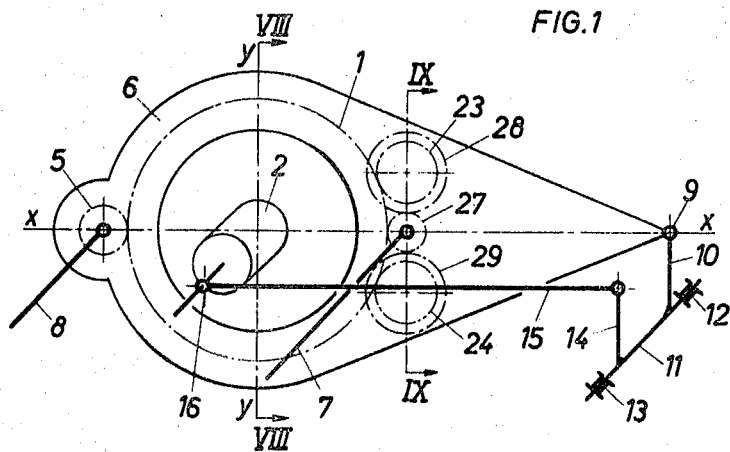
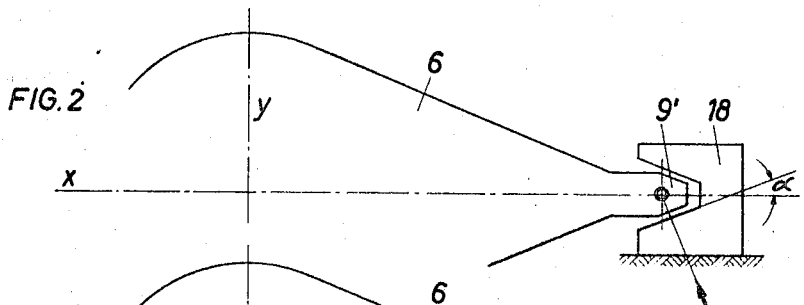
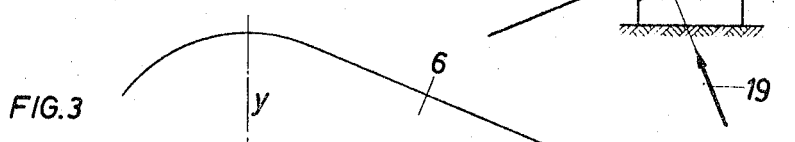
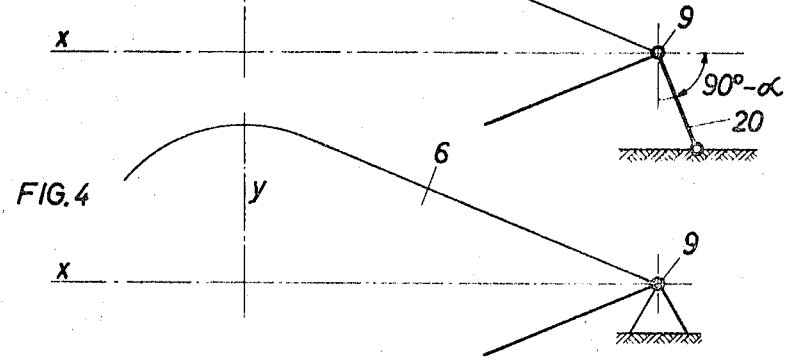
INVENTOR
FELIX FRITSCH
BY
ATTORNEYS July 22, 1969  F. FRITSCH  3,456,520

TRANSMISSION FOR MOVING LARGE EQUIPMENT, PARTICULARLY CONVERTERS

Filed Feb. 12, 1968  2 Sheets-Sheet 2

INVENTOR
FELIX FRITSCH
BY Imirie & Smiley
ATTORNEYS

United States Patent Office

3,456,520
Patented July 22, 1969

3,456,520
TRANSMISSION FOR MOVING LARGE EQUIPMENT, PARTICULARLY CONVERTERS
Felix Fritsch, Vienna, Austria, assignor to Simmering-Graz-Pauker Aktiengesellschaft fur Maschinen-, Kessel- und Waggonbau, Vienna, Austria
Filed Feb. 12, 1968, Ser. No. 704,682
Claims priority, application Austria, Feb. 15, 1967,
A 1,460/67
Int. Cl. F16h *57/00*
U.S. Cl. 74—410                                    5 Claims

ABSTRACT OF THE DISCLOSURE

A transmission comprising a housing and a large gear, which is disposed in the housing and in mesh with at least three driven pinions. The housing is clear of the large gear and of a driving shaft extending from said large gear.

---

Figure 5:
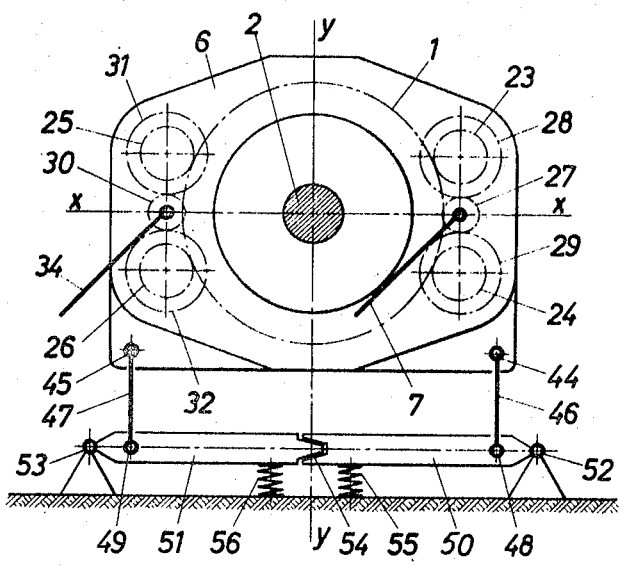

A transmission for moving large equipment, particularly converters, comprising a housing containing a large gear and at least three pinions in mesh with said gear. The large gear is secured to a driving shaft, which transmits the drive to the large equipment. The pinions are connected to a drive source. The large gear and the driving shaft are clear of the housing.

The invention relates to a transmission for moving large equipment, particularly converters, comprising a large gear, which is secured to the drive trunnion, and three or more pinions, which are mounted in a common, rigid frame or housing and in mesh with the large gear for the transmission of torque.

There are many known types of drive means for large equipment, such as mills, crushers, cement kilns and particularly steelmaking converters. Those drive means in which at least a part of the transmission is mounted on the drive trunnion of the converter or the like have proved particularly satisfactory because a deformation and bearing clearance of the trunnion will not interfere with the toothed mesh between the large gear, which is connected to the trunnion, and the pinion. Owing to the large torques to be transmitted, a plurality of pinions are provided in most cases at the periphery of the large gear.

The invention teaches how the advantages of such an arrangement can be obtained without need for mounting the transmission housing or parts thereof on the trunnion of the converter. The drive is transmitted to the large gear by at least three pinions, which transmit equal individual forces and by their engaging tooth sides ensure that the transmission is centered on the axis of the large gear.

Designs are known in which a plurality of pinions are in mesh with the large gear and each pinion is driven by a gear reducer from a separate motor. Whereas the forces are approximately equal owing to the individual drive units, this transmission must be mounted on the trunnion. In view of the considerable size of the trunnions of large converters, the mounting is very expensive and it is difficult to assembly and remove the transmission. Besides, as many drive motors are required as there are pinions.

In another known design, four pinions in mesh with the large gear are mounted in a rigid or articulated frame and each pinion is coupled to another by a power-distributing gear reducer so that two drive motors are sufficient. In this arrangement, a mounting on the trunnion is also required, which is undesirable.

In another known design comprising two, three or four pinions, each pinion is mounted in a separate frame and these frames are guided by rollers or slide blocks running on tracks provided on the periphery of the large gear and are supported against each other and the foundation by torque supports. This design is relatively simple with two pinions but becomes complicated with three or even four pinions and has a centering arrangement which is effective also in the plane of the large gear and comprises rollers running on the periphery of the gear rather than central bearings.

In planetary gear trains comprising spur gears it is known to provide individual elements, such as the sun wheels, which have no bearings. This design cannot be used with more than three pinions (planet wheels) and requires a gear-ring, which would not be suitable in transmissions of the size required for converters.

Another design has been proposed in which two pinions are driven by a power-distributing transmission. This design can be used only with two pinions and the latter must also be centered by concentric tracks on the large gear.

It is an object of the invention to avoid the disadvantages of the known designs.

An important feature of the invention resides in the provision of a transmission which comprises a housing, transmission gears contained in the housing, a trunnion extending from said housing and serving to transmit a drive to the large equipment, a large gear having external teeth and secured to said trunnion, at least three pinions which are driven by a drive means and in mesh with the large gear to transmit to the latter the torque which is imparted to the pinions, said housing surrounding said large gear and said trunnion without a bearing support on the same, at least two adjacent ones of said pinions being driven from a common shaft by means of a branching transmission.

According to another feature of the invention, the common drive shaft for these two pinions is positively driven in synchronism with the drive shaft for the third or other pinion.

Finally, it is a feature of the invention that the transmission housing is supported against the foundation or a stationary part of the machine by a torque support in such a manner that the resultant of the assumedly equal tooth pressure of all pinions and the reaction force of that torque support is zero.

Figure 6:
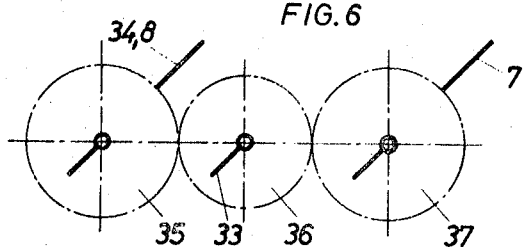
Figure 8:
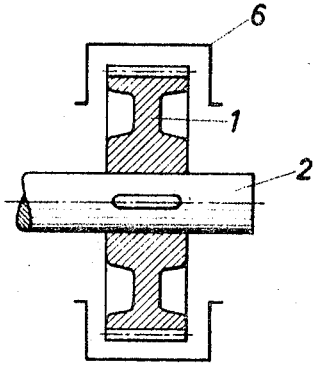
Figure 7:
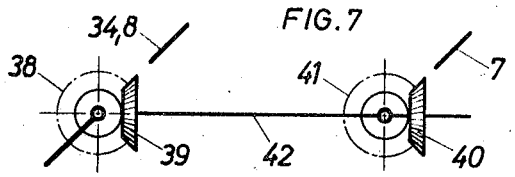
Figure 9:
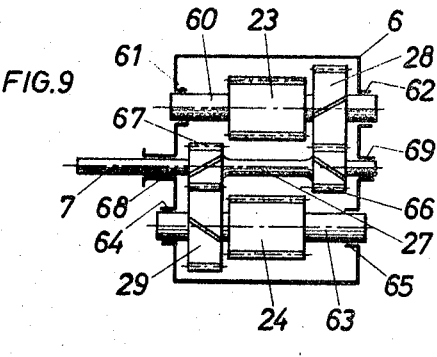

Some embodiments of the transmission are shown in the drawing. FIG. 1 is a diagrammatic view showing a first embodiment of the transmission. FIGS. 2 to 4 show different bearings of the housing end. FIG. 5 shows a drive system comprising four pinions. FIGS. 6 and 7 show two different means for ensuring a synchronous operation of two shafts. FIG. 8 is a sectional view taken on line VIII—VIII in FIG. 1. FIG. 9 is a sectional view taken on line IX—IX of FIG. 1.

In FIG. 1, a trunnion 2 serves for driving one of the above-mentioned large units, such as a converter. A large gear 1 having external teeth is secured to the trunnion 2 and in mesh with three pinions 5, 23, and 24. All pinions are mounted in a housing 6. To this end, as is shown in FIG. 9, the pinion 23 is mounted on a shaft 60, the two ends of which are mounted in bearings 61 and 62 in the housing 6. Just as the pinion 23, the pinion 24 is mounted on a shaft 63, the free ends of which are mounted in bearings 64 and 65 in the housing 6. The pinions 23 and 24 are driven from a common drive pinion 27 by a power-distributing transmission, e.g., 28, 29. The pinion 27 is rotated by a shaft 7. The gear 28 is secured to the shaft 60 and in mesh with a toothed rim 66 of the drive pinion 27. The gear 29 is secured to the shaft 63 and in mesh with a second toothed rim 67 of the drive pinion 27. For instance, the gears 28, 29 may have helical teeth of opposite hand and the pinion 27 may be provided with mating double helical teeth and arranged to be self-adjusting in the axial direction, in known manner. This design is not essential. It may be particularly desirable to use a branching transmission which includes a planetary gear train having spur gears. The shaft 7 which carries the pinion 27 is mounted in bearings 68, 69 in the housing 6 and is driven. A shaft 8 which is also mounted in the housing 6 drives the pinion 5 (FIG. 1) in synchronism with the shaft 7. The synchronous operation of the shafts 7, 8 is preferably ensured by gears, in an arrangement such as shown in FIGS. 6 and 7, which will be described in detail hereinafter.

The housing 6 has no bearing support on the drive trunnion 2 and/or the large gear 1 in the plane thereof. This means that the housing 6 is clear of the pinion and the gear 1, as is shown in FIG. 8.

The housing is connected at 9 to a lever 10, which is secured to a shaft 11, which is supported by bearings 12 and 13 on a foundation. The shaft 11 carries another lever 14, which is also articulately connected to a drawbar 15 and by the latter to a bearing 16 on the converter trunnion 2. The distance from point 9 to the center of the trunnion 2 is somewhat larger than 1.5 times the diameter of the large gear 1 and depends on the center distance between pinions 23 and 24. This center distance should be as small as possible.

Within the scope of the invention, other means for supporting the housing at the point 9 may be employed. FIG. 2 shows a housing having a tooth profile at the end 9' and supported in a bearing bracket 18, which has sides that are inclined against the transmission axis X at an angle $\alpha$, which corresponds to the pressure angle of the teeth of the large gear. The transmission axis X is the axis which extends through the center of pinion 5 and midway between pinions 23 and 24 and preferably through the center of the trunnion 2. In this arrangement, the support reaction has a certain inclination toward the center of the transmission. This inclination can also be enforced in a transmission which exerts force only in one direction, as is shown in FIG. 3. In this embodiment the point 9 of the housing 6 is supported by a simple link 20, which has an inclination $90° - \alpha$ from the axis X.

When the housing is not required to follow in the direction of the axis X any movements of the trunnion 2 and this freedom of movement is restricted to the direction Y, the point 9 of the housing may be articulatedly supported directly on the frame or foundation in a very simple manner, as is shown in FIG. 4.

In the embodiment shown in FIG. 4, four drive pinions are provided. A large gear 1 is secured to the drive trunnion 2 of the converter and in mesh with the pinions 23 to 26. Just as in the embodiment of FIG. 1, pinions 23 and 24 are driven from shaft 7 by pinion 27 and gears 28 and 29, respectively.

The opposite pair of pinions 25, 26 are driven from the drive pinion 30 by the gears 31 and 32 without a distribution of power. The design of the pinion 30 and of the gears 31, 32 and the mounting of the members of the transmission in the housing may be the same as shown in FIG. 9 for the parts 27 to 29. The shaft for driving the pinion 30 is indicated at 34.

In this arrangement, the pinions 23, 24 apply equal tooth pressures to the large gear 1 and the pinions 25, 26 perform equal angular movements.

The driving connections between the drive shafts 7, 34 and the pinions 27 and 30 are similar to those between the shafts 7, 8.

This operative connection may be established by gears 35, 36, 37, as is shown in FIG. 6, or by bevel gears 38 to 41 and a shaft 42, as shown in FIG. 7, or by other positively acting elements, such as chains or the like.

In the embodiment of FIG. 6, the gear 35 is mounted on the shaft 8 or 34 and the gear 37 is mounted on the shaft 7. The gear 36 in mesh with the gears 35, 37 is mounted on an idler shaft 33 having an axis which extends preferably in the plane which is defined by the axes of the two gears 35, 37. The idler shaft 33 is mounted in a housing 6', which is similar in function to the housing 6 in FIG. 1.

In the embodiment shown in FIG. 7, the bevel gear 38 is secured to the shaft 8 or 34 and the bevel gear 41 is secured to the shaft 7. The bevel gear 38 is in mesh with the bevel gear 39, which is operatively connected by the shaft 42 to the bevel gear 40, which is in mesh with the bevel gear 41.

Just as the functionally equivalent pinions in the embodiment of FIG. 1, the pinions 23, 24, 25, 26 are rigidly mounted in the housing, box or frame 6'. The latter has no bearing support on the trunnion 2 or large gear 1 and is only guided in the plane of the large gear. Centering is effected by the toothed mesh of the large gear 1 with the pinions 23 to 26.

When an external transverse force is not applied to the housing 6', the equilibrium conditions ensure that the sum of the tooth pressures on the left side (pinions 25, 26) is equal to the sum of the tooth pressures on the right side (pinions 23, 24). The forces on the pinions 23 and 24 are equalized by the power-distributing drive means for driving said pinions. The equilibrium conditions ensure also that the forces of the pinions 25 and 26 are the same so that all four tooth pressures applied to the large gear have the same magnitude.

The rigid operative connection between the pinions 25, 26 ensures that the center distance between the large gear and these pinions is determined in a statically determinate manner. This center distance will depend only on the angular relation between the pinions 25, 26 and this angular relation is unvariable owing to their common, rigid drive means.

The operative connection between the shafts 7, 34 ensures the correct orientation of the housing 6' relative to the trunnion 22 in the direction Y. This operative connection is shown in FIGS. 6 and 7.

As has been assumed hereinbefore, the equality of the tooth pressures acting on the large gear depends on the absence of an external transverse force acting on the housing 6'. For this reason the required torque support is provided by two parallel support reactions of equal magnitude. This is accomplished by the use of a special torque-supporting system, which is known per se and shown by way of example in FIG. 5.

Vertical tension-compression links 46, 47 are connected at pivots 44, 45 to the housing 6' and are pivoted at 48, 49 to substantially horizontal levers 50, 51, respectively. The levers 50, 51 are connected to one another and at their outer ends are supported at pivots 52, 53 on the foundation. The levers 50, 51 support each other by teeth 54, a slide block, slot and pin or the like.

Without detailed explanation it is easily understood that in this arrangement the trunnion 22 and with it the housing 6' can perform any desired movements to the left and right and in upward and downward directions but the housing 6' cannot rotate about the large gear 1.

The same effect can be obtained by other means. For instance, the levers 50, 51 provided with the teeth 54 may be replaced by bell-crank levers and a connecting rod or by a rotary shaft.

Resilient or hydraulically balanced torque supports are also known and can be used, provided that they are capable of transmitting torque without a development of a transverse force.

In drive systems in which the main shaft 2 is horizontal or inclined, the weight of the transmission housing 6' and of the pinions and gears mounted therein is supported through the teeth of pinions 23 to 26 on the large gear so that different tooth pressures are applied. This is undesirable. For this reason it is preferable, particularly with large and heavy drive means, to compensate that weight, e.g., by counterweights, hydraulic piston forces or, as is shown in FIG. 5, by one or more springs 55, 56, each of which supports the lever arm disposed between the connection 48 or 49 to the link 46 or 47 and the teeth 54.

A drive can be transmitted to the transmission according to the invention in any embodiment whatever by means of one motor or a plurality of motors at any desired point and, if desired, by further gear reducers, selectively to one of the shafts 7, 8, 33, 34, 42 or a plurality or all of said shafts to the gears 35, 36, 37.

What is claimed is:

1. A transmission for moving large equipment, said transmission comprising a housing, transmission gears contained in the housing, a trunnion extending from said housing and serving to transmit a drive to the large equipment, a large gear having external teeth and secured to said trunnion, at least three pinions which are driven by a drive means and in mesh with the large gear to transmit to the latter the torque which is imparted to the pinions, said housing surrounding said large gear and said trunnion without a bearing support on the same, at least two adjacent ones of said pinions being driven from a common shaft by means of a branching transmission.

2. A transmission as set forth in claim 1, characterized in that said shaft of said branching transmission is in positive operative connection with a drive shaft of at least one of the other pinions.

3. A transmission as set forth in claim 2, characterized in that said operative connection is established by gears.

4. A transmission as set forth in claim 1, characterized in that three pinions are so arranged at the periphery of the large gear that the pinions connected by the branching transmission are as closely spaced as possible and are spaced by approximately equal angles from the third pinion, and the transmission housing is supported at a point (9 or 9') which lies approximately on the axis of symmetry of the three pinions, and said point is spaced from the trunnion diameter by at least 1.5 times the diameter of the large gear.

5. A transmission as set forth in claim 1, characterized in that four pinions (23-26) are disposed at the periphery of the large gear approximately symmetrically with respect to an axis passing through the center of the large gear, and the housing is supported by two articulated joints on a torque-supporting system, which ensures that the reaction forces acting on the articulated joints at the housing are parallel, equal in magnitude, and oppositely directed.

References Cited

UNITED STATES PATENTS

| | | | |
|---|---|---|---|
| 1,806,328 | 5/1931 | Brown | 74—410 |
| 2,911,845 | 11/1959 | North | 74—410 |
| 3,167,975 | 2/1965 | Durand. | |
| 3,299,729 | 1/1967 | Durand | 74—410 X |
| 3,388,608 | 6/1968 | Durand | 74—410 |

LEONARD H. GERIN, Primary Examiner